United States Patent
Choi et al.

(10) Patent No.: US 8,980,429 B2
(45) Date of Patent: Mar. 17, 2015

(54) TILE FOR REMOVING FORMALDEHYDE AND PROCESS FOR PREPARING THE SAME

(75) Inventors: Jong-Sik Choi, Daejeon (KR); Ju-Hyung Lee, Seoul (KR); Seong-Moon Jung, Daejeon (KR); Sun-Joo Kim, Daejeon (KR)

(73) Assignee: LG Hausys, Ltd. (KR)

( * ) Notice: Subject to any disclaimer, the term of this patent is extended or adjusted under 35 U.S.C. 154(b) by 459 days.

(21) Appl. No.: 12/675,673

(22) PCT Filed: Oct. 2, 2007

(86) PCT No.: PCT/KR2007/004814
§ 371 (c)(1),
(2), (4) Date: Feb. 26, 2010

(87) PCT Pub. No.: WO2009/028755
PCT Pub. Date: Mar. 5, 2009

(65) Prior Publication Data
US 2010/0255987 A1    Oct. 7, 2010

(30) Foreign Application Priority Data
Aug. 28, 2007  (KR) .................. 10-2007-0086581

(51) Int. Cl.
*B32B 9/00*    (2006.01)
*C04B 33/13*   (2006.01)
*C04B 41/00*   (2006.01)
*C04B 41/50*   (2006.01)
*C04B 41/86*   (2006.01)

(52) U.S. Cl.
CPC .............. *C04B 33/13* (2013.01); *C04B 41/009* (2013.01); *C04B 41/5022* (2013.01); *C04B 41/86* (2013.01)

USPC .......................................................... 428/408

(58) Field of Classification Search
CPC ....................................................... C01B 32/00
USPC .......................................................... 428/408
See application file for complete search history.

(56) References Cited

U.S. PATENT DOCUMENTS 6,964,142 B1 *  11/2005  Otani .................. 52/794.1

FOREIGN PATENT DOCUMENTS

| JP | 2006-248793 | 9/2006 |
|---|---|---|
| KR | 10-2000-0025067 | 5/2000 |
| KR | 10-2001-0049437 | 6/2001 |
| KR | 10-2003-0042595 | 6/2003 |
| KR | 100478949 | 3/2005 |
| KR | 10-2006-0010416 | 2/2006 |
| KR | 10-0677761 | 1/2007 |

OTHER PUBLICATIONS

JP 2006-248793 Translation of detailed description (2006).*
International Search Report—PCT/KR2007/004814 dated May 21, 2008.
Written Opinion—PCT/KR2007/004814 dated May 21, 2008.

* cited by examiner

Primary Examiner — Daniel H Miller
(74) Attorney, Agent, or Firm — Cantor Colburn LLP

(57) ABSTRACT

A tile using an activated carbon, which is excellent as a formaldehyde absorbent, and a preparation process thereof are disclosed. The effect of activated carbon on absorbing formaldehyde is maximized by the activated carbon-in-core structure, in which the problem of activated carbon that is easily oxidized during a heat treatment may be overcome.

4 Claims, 1 Drawing Sheet

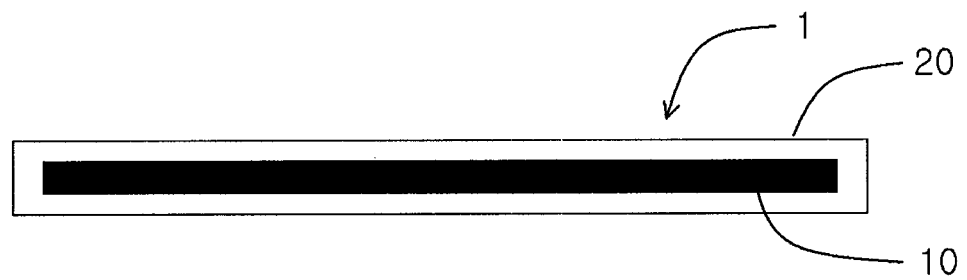

TILE FOR REMOVING FORMALDEHYDE AND PROCESS FOR PREPARING THE SAME

TECHNICAL FIELD

The present invention relates to a functional tile and a process for preparing the same, and more particularly to a tile for removing formaldehyde and a process for preparing the same.

BACKGROUND ART

As an absorbent added in the production of a functional tile for removing formaldehyde using loess or clay, use can be made of various materials such as charcoals, zeolites, diatomites, or ashes.

In connection to the above, Korean Patent Laid-open Publication No. 2001-49437 discloses a building material and room using allophane, Korean Patent Registration No. 495571 discloses a healthy tile using fly ash and diatomite, Korean Patent Registration No. 478949 discloses a process for producing an earthen vessel containing charcoal using wood flour, Korean Patent Registration No. 301253 discloses a wallboard having a humidity function and a manufacturing method thereof, Korean Patent Registration No. 677761 discloses functional building materials and a method for production thereof, and Japanese Patent Laid-open Publication No. 2006-248793 discloses a tile material for construction. There are other various techniques in relation therewith, but none has been described of an activated carbon constituting the core according to the present invention and improvement in formaldehyde absorption performance using the same.

The most important factor for improving formaldehyde removal performance of a functional tile is the performance of an absorbent itself. However, when including the absorbent to actually exert its function, there may be concerns of deterioration and reduced performance of the absorbent itself due to the heat treatment in the preparation process of the tile. Therefore, an ideal tile for removing formaldehyde results from a technique that is capable of maximizing the realization of the initial performance of the absorbent.

DISCLOSURE

Technical Problem

Therefore, the present invention has been made in view of the above problems, and it is an object of the present invention to provide a tile which can realize a maximum absorption performance of an activated carbon by including the activated carbon with excellent formaldehyde absorption performance as a core of the tile, and a preparation process thereof.

Technical Solution

In accordance with an aspect of the present invention, the above and other objects can be accomplished by the provision of a tile comprising a core and a surface layer surrounding the core, wherein an activated carbon is contained only in the core and removed from the surface layer by a heat treatment.

The surface layer may contain ash formed by oxidation of an activated carbon, and as a result, the surface hardness and strength of the tile may be improved.

The tile of the present invention may be produced from a composition which comprises 40 to 80% by weight of a loess, 0 to 20% by weight of a clay, 5 to 30% by weight of an activated carbon, and 10 to 30% by weight of water.

It is preferable that the activated carbon is a finely pulverized powder with a particle size of 0.14 mm (100 mesh) or less in consideration of its effect on removing formaldehyde.

In accordance with another aspect of the present invention, there is provided a process for preparing a tile by subjecting the composition containing the activated carbon to a heat treatment.

Specifically, the process comprises the steps of: preparing a dry mixture of 40 to 80% by weight of a loess, 0 to 20% by weight of a clay, and 5 to 30% by weight of an activated carbon; adding 10 to 30% by weight of water to the mixture and kneading the wet mixture for extrusion molding; drying the extruded molding at 60 to 100° C. for 40 to 70 minutes, and baking the dried molding at 600 to 900° C. for 60 minutes or less.

Preferably, the process further comprises the steps of applying a glaze on the dried molding before baking for improving the contamination resistance of tile. At this time, it is preferable that the glaze has a melting point temperature of 600 to 1,100° C. and contains 30 to 50% by weight of water for increasing the surface porosity.

DESCRIPTION OF DRAWINGS

The above and other objects, features and other advantages of the present invention will be more clearly understood from the following detailed description taken in conjunction with the accompanying drawings, in which:

FIG. 1 is a cross sectional view of a tile according to the present invention.

BEST MODE

The present invention will be described in a greater detail with reference to the accompanying drawing and Examples.

FIG. 1 is a cross sectional view of a tile according to the present invention. The tile 1 of the present invention comprises a core 10 and a surface layer 20 surrounding the core 10.

The core 10 contains an activated carbon, a loess and/or a clay, and the activated carbon in the surface layer 20 is removed by a heat treatment.

Activated carbon has a good reactivity such that it is removed by the heat treatment. Therefore, the activated carbon does not exist in the surface layer 20, but rather the activated carbon is oxidized and exists as ash.

When examining a cross-section of the tile 1 of the present invention, the core 10 and the surface layer 20 are clearly distinguished by their colors. That is, the surface layer 20 containing the loess and/or clay exhibits yellow ochre, while the core layer 10 containing the activated carbon exhibits blackness.

Accordingly, a suitable heat treatment allows the activated carbon to exist only in the core 10, and removes it from the surface layer 20. Thereby, the activated carbon is protected by the surface layer 20 so that the effect of activated carbon on absorbing formaldehyde can be maximized. Moreover, due to the ash resulting from the oxidized activated carbon in the surface layer 20, the surface hardness and strength of the tile can be increase.

The process for preparing a tile of the present invention is carried out in the following order.

First, a tile composition is prepared.

The tile composition is a dry mixture of 40 to 80% by weight of a loess, 0 to 20% by weight of a clay, and 5 to 30% by weight of an activated carbon. The clay may be optionally added.

It is preferable that each base material is used in a finely pulverized powder, in consideration of its effect on removing formaldehyde. Particularly, the activated carbon in a finely pulverized powder having a particle size of 0.14 mm (100 mesh) or less is preferably used.

Next, 10 to 30% by weight of water is added to the mixture, and the wet mixture is kneaded for extrusion molding.

Subsequently, the extruded green tile molding is dried at 60 to 100° C. for 40 to 70 minutes.

Then, the dried tile molding is baked in a continuous firing furnace at a maximum baking temperature of 600 to 900° C. with the time for maintaining the maximum temperature of 0.5 to 20 minutes, and for the total baking time of 60 minutes or less.

In the above process, a glaze can be applied to the tile to increase contamination resistance, and it is preferable that the glazing process is carried out between the steps of drying and baking. The type of glaze used herein is not particularly limited. However, it is preferable that a glaze has a melting point temperature of about 600 to 1,100° C. and contains 30 to 50% by weight of water to increase the surface porosity.

Mode for Invention

Example 1

60 to 80% by weight of a loess, 10 to 20% by weight of an activated carbon having a particle size of 0.14 mm or less, and 10 to 30% by weight of water were added, and the mixture was kneaded for extrusion molding. The molded tile was dried at 60 to 100° C. for 50 minutes and subjected to a heat treatment at 800° C. for the total baking time of 60 minutes to prepare a tile with an activated carbon core.

Example 2

A tile was prepared in the same manner as in Example 1, except that a glaze, with a melting point of 1,000° C., containing 50% by weight of water was applied onto the dried molded tile between the steps of drying and baking. The subsequent baking step was carried out in the same manner as in Example 1.

Comparative Example 1

A loess tile

Comparative Example 2

A charcoal tile

Experimental Example

A formaldehyde absorption performance on the tiles of Examples and Comparative Examples were evaluated, and the results are presented in Table 1. The formaldehyde absorption amount was measured by the amount of formaldehyde absorbed per 1 g of the tile material.

TABLE 1

|  | Formaldehyde absorption amount (µg/g) |
| --- | --- |
| Comparative Example 1 | 5.3 |
| Comparative Example 2 | 5.5 |

TABLE 1-continued

|  | Formaldehyde absorption amount (µg/g) |
| --- | --- |
| Example 1 | 52 |

As can be seen from Table 1, the tile according to the present invention maximized the formaldehyde absorption performance of the activated carbon by adopting the activated carbon-in-core structure. The tile of the present invention had excellent formaldehyde absorption amount of about 10 times compared with the conventional tile using loess or charcoal.

According to the present invention, a core of tile contains an activated carbon with excellent formaldehyde absorption performance, thereby allowing maximum absorption performance of the activated carbon. Moreover, a surface layer of tile includes ash formed from the oxidized activated carbon, so that the surface hardness and strength of the tile may be increased.

INDUSTRIAL APPLICABILITY

The tile of the present invention can be expected to have a maximum absorption performance while maintaining the basic physical properties of an activated carbon which has excellent formaldehyde absorption performance. Also, the oxidized activated carbon forms ash in the surface of the tile such that a surface binding effect is obtained. As a result, the surface hardness and strength of the tile can be increased.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A tile containing activated carbon, the tile comprising:
   a core including the activated carbon, and loess and/or clay; and
   a surface layer surrounding the core, the surface layer including ash, and loess and/or clay,
   wherein the surface layer contains substantially no activated carbon, but contains the ash formed by oxidation of the active carbon,
   wherein the tile is produced by a heat treatment of a composition comprising 40 to 80% by weight of a loess, 0 to 20% by weight of a clay, 5 to 30% by weight of an activated carbon, and 10 to 30% by weight of water; and
   the activated carbon is a finely pulverized powder having a particle size of 0.001 to 0.14 mm.

2. A process for manufacturing a tile of claim 1, wherein the process comprises the steps of:
   preparing a dry mixture of 40 to 80% by weight of a loess, 0 to 20% by weight of a clay, and 5 to 30% by weight of an activated carbon;
   adding 10 to 30% by weight of water to the dry mixture to form a wet mixture, and kneading the wet mixture for extrusion molding;
   extrusion-molding the kneaded wet mixture;
   drying the extruded molding at 60 to 100° C. for 40 to 70 minutes; and
   baking the dried molding at 600 to 900° C. for 1 to 60 minutes.

3. The process according to claim 2, wherein the process further comprises the step of applying a glaze on the dried molding before baking.

4. The process according to claim 2, wherein the glaze has a melting point temperature of 600 to 1,100° C. and contains 30 to 50% by weight of water.

\* \* \* \* \*